United States Patent
Tsujie et al.

(10) Patent No.: US 12,221,057 B2
(45) Date of Patent: Feb. 11, 2025

(54) BASE FABRIC FOR AIRBAG, MANUFACTURING METHOD FOR BASE FABRIC FOR AIRBAG, AND AIRBAG

(71) Applicant: Toray Industries, Inc., Tokyo (JP)

(72) Inventors: Akira Tsujie, Osaka (JP); Taiki Hosaka, Osaka (JP)

(73) Assignee: Toray Industries, Inc., Tokyo (JP)

( * ) Notice: Subject to any disclaimer, the term of this patent is extended or adjusted under 35 U.S.C. 154(b) by 603 days.

(21) Appl. No.: 17/435,735

(22) PCT Filed: Feb. 21, 2020

(86) PCT No.: PCT/JP2020/007207
§ 371 (c)(1),
(2) Date: Sep. 2, 2021

(87) PCT Pub. No.: WO2020/179518
PCT Pub. Date: Sep. 10, 2020

(65) Prior Publication Data
US 2022/0134992 A1    May 5, 2022

(30) Foreign Application Priority Data
Mar. 6, 2019    (JP) .................... 2019-040185

(51) Int. Cl.
*B60R 21/235*    (2006.01)
*B32B 5/02*    (2006.01)
*B32B 27/12*    (2006.01)

(52) U.S. Cl.
CPC ............ *B60R 21/235* (2013.01); *B32B 5/024* (2013.01); *B32B 27/12* (2013.01); *B32B 2307/51* (2013.01); *B32B 2605/00* (2013.01); *B60R 2021/23514* (2013.01); *B60R 2021/23542* (2013.01)

(58) Field of Classification Search
CPC ........ B60R 21/235; B32B 5/024; B32B 27/12
USPC ........................................................ 442/286
See application file for complete search history.

(56) References Cited

U.S. PATENT DOCUMENTS

| 6,715,790 B2 * | 4/2004 | Breed ................ B60R 21/213 |
| | | 280/730.2 |
| 2002/0122908 A1 * | 9/2002 | Li .......................... B32B 5/024 |
| | | 428/36.2 |
| 2008/0042414 A1 | 2/2008 | Nagaoka |
| 2010/0190395 A1 | 7/2010 | Nozoe et al. |
| 2014/0220245 A1 | 8/2014 | Nagaoka |

FOREIGN PATENT DOCUMENTS

| EP | 0 866 164 A1 | 9/1998 |
| EP | 1 698 523 A2 | 9/2006 |
| JP | H06-299465 A | 10/1994 |
| JP | H07-166476 A | 6/1995 |
| JP | H11-1876 A | 1/1999 |
| JP | 2003-175789 A | 6/2003 |
| JP | 2004-522003 A | 7/2004 |
| JP | 2006-062590 A | 3/2006 |
| WO | 02/18180 A2 | 3/2002 |
| WO | 2006/009072 A1 | 1/2006 |

OTHER PUBLICATIONS

Extended European Search Report dated Dec. 5, 2022, of counterpart European Patent Application No. 20766713.0.

* cited by examiner

*Primary Examiner* — Vincent Tatesure
(74) *Attorney, Agent, or Firm* — DLA Piper LLP (US)

(57) ABSTRACT

A base fabric for an airbag has a puncture load equal to or more than 6.0 N, wherein values obtained by dividing a bending stiffness (method A of JIS L 1096(2010)8.21) in each of a warp direction and a weft direction by a cover factor are equal to or less than 0.030 mm.

3 Claims, No Drawings

BASE FABRIC FOR AIRBAG, MANUFACTURING METHOD FOR BASE FABRIC FOR AIRBAG, AND AIRBAG

TECHNICAL FIELD

This disclosure relates to a base fabric for an airbag, a manufacturing method for a base fabric for an airbag, and an airbag.

BACKGROUND

Various types of airbags are widely used as safety devices for protecting a passenger of a vehicle. Examples of airbags include an airbag for protecting a driver and an airbag for protecting a passenger seat occupant as well as an airbag for protecting knees, an airbag built in a seat for protecting a chest, and an airbag mounted behind a ceiling above an upper part of a window for protecting a head. Airbags are increased in mounting parts, extended in protection area, and improved in protection performance.

In recent years, there has been a demand for airbags to be improved in protection performance in terms of shock absorption and, in addition, have durability for ensuring expansion performance such as wear resistance, scratch resistance, and cut resistance of a fiber material forming the airbags. In particular, when corner portions and the like of pieces of glass scattered at the time of vehicle collision cause damage on a base fabric surface of an airbag after expansion, it is possible that the airbag involves outflow of gas from the damaged portion, degradation in internal pressure retention performance, and degradation in shock absorption performance. Therefore, there has been a demand for a base fabric used for an airbag to have cut resistance against various broken parts present inside and outside the vehicle after vehicle collision.

Further, along with the extension in protection area of an airbag, a use amount of the base fabric is increasing. Meanwhile, in view of extending a cabin space for comfortability of a passenger, downsizing of an airbag module is required. There has been a demand for a base fabric for an airbag to be further improved in storability. That is, there has been a demand for a base fabric for an airbag which occupies a large volume among components of an airbag module to be improved in storability after being folded.

Thus, in recent years, there has been a demand for a base fabric for an airbag which is excellent in cut resistance and excellent also in storability.

As a method of obtaining a base fabric for an airbag having high durability, for example, in JP 2004-522003 A, there is disclosed a method of using a base fabric having a covering material (such as polyurethane), a film, and cloth on a surface thereof to exhibit favorable wear resistance and breakage resistance.

Further, in JP 2006-62590 A, it is proposed that use of a base fabric obtained by sewing a covering material containing a cut-resistant material (such as aromatic polyamide or PBO fiber) enables protection of an airbag from being cut by a contact object.

However, the above publications relate to a base fabric combined with fiber, a film, or cloth having cut resistance. Thus, even though the cut resistance is improved, a demand for improvement in storability is not satisfied.

It could therefore be helpful to provide an airbag that has the cut resistance required to ensure airbag expansion performance even in an environment in which broken interior/exterior components and broken pieces of glass are given at the time of collision and that is excellent in storability to achieve the capability of securing a cabin space owing to downsizing of an airbag module, and to provide a base fabric for an airbag.

SUMMARY

We thus provide a base fabric for an airbag formed of a fabric which has a puncture load (JIS T 8051(2005)5) of equal to or more than 6.0 N and in which values obtained by dividing a bending stiffness (method A of JIS L 1096(2010) 8.21) in each of a warp direction and a weft direction by a cover factor are equal to or less than 0.030 mm.

We further provide a manufacturing method for a base fabric for an airbag, which is a method of manufacturing the above-mentioned base fabric for an airbag, the manufacturing method for a base fabric comprising an application step of applying two layers of resins having different elongations in superposition, wherein the application step includes: a first-layer forming step of arranging, as a first layer in contact with a fabric, a resin having an elongation of equal to or more than 500%; and a second-layer forming step of arranging, as a second layer, a resin having an elongation of equal to or less than 300% on the first layer.

DETAILED DESCRIPTION

Base Fabric for Airbag

Our base fabric for an airbag is formed of a fabric having a puncture load (JIS T 8051(2005)5) of equal to or more than 6.0 N and in which values obtained by dividing a bending stiffness (method A of JIS L 1096(2010)8.21) in each of a warp direction and a weft direction by a cover factor are equal to or less than 0.030 mm. Specifically, the base fabric for an airbag is, for example, a coated fabric obtained by coating a fabric fabricated by weaving polyamide fiber or polyester fiber with a thermoplastic resin coated thereon and, preferably, subjecting the resultant to a thermal curing setting step.

Examples of the polyamide fiber include fibers formed of nylon 6, nylon 6,6, nylon 12, nylon 46, copolyamide of nylon 6 and nylon 6,6, and copolyamide obtained through copolymerization of nylon 6 with polyalkylene glycol, dicarboxylate, or amine. Examples of the polyester fiber include fibers formed of polyethylene terephthalate or polybutylene terephthalate.

It is more preferred that the base fabric for an airbag be a fabric fabricated by weaving polyamide fiber, and it is preferred that the polyamide fiber be fiber formed of nylon 6 or nylon 6,6, which provide excellent impact resistance for an airbag to be obtained.

In this example, the total fineness of the fiber is not particularly determined. For example, it is preferred that the total fineness of the fiber be equal to or more than 235 dtex, more preferably equal to or more than 280 dtex. Further, it is preferred that the total fineness of the fiber be equal to or less than 940 dtex, more preferably equal to or less than 700 dtex. When the total fineness falls within the above-mentioned range, an airbag to be obtained is likely to have required mechanical characteristics (such as tensile strength and tear strength) and is excellent in lightness and compactness. The total fineness of the fiber is calculated based on the method A of JIS L 1013(2010)8.3.1.

Further, in this example, a single fiber fineness of the fiber is not particularly limited. For example, it is preferred that the single fiber fineness of the fiber be equal to or more than 1 dtex, more preferably equal to or more than 1.5 dtex, further preferably equal to or more than 2 dtex. Further, it is preferred that the single fiber fineness of the fiber be equal to or less than 8 dtex, more preferably equal to or less than 7 dtex. When the single fiber fineness of the fiber is equal to or more than 1 dtex, single fiber breakage at the time of manufacture can be suppressed, and hence the fiber can easily be manufactured. Further, when the single fiber fineness of the fiber is equal to or less than 8 dtex, the flexibility of the warp and the weft to be obtained is improved. The single fiber fineness of the fiber can be calculated by dividing the total fineness by the number of filaments. The number of filaments is calculated based on the method of JIS L 1013(2010)8.4. In this example, the number of filaments of the polyamide fiber is not particularly limited. For example, to improve the strength and storability of the fabric in a well-balanced manner, it is preferred that the number of filaments of the polyamide fiber be from 12 to 192, more preferably from 24 to 154.

A sectional shape of the single fiber of the fiber is not particularly limited. For example, the sectional shape of the single fiber may be a circular shape, a shape among various non-circular shapes such as an X-shape, a C-shape, a Y-shape, a V-shape, and a flat shape, or a shape having a hollow part. Among those shapes, in view of ease of spinning, it is preferred that the sectional shape of the single fiber be the circular shape.

It is preferred that a tenacity of the fiber be equal to or more than 8.0 cN/dtex, more preferably equal to or more than 8.4 cN/dtex. When the tenacity of the fiber falls within the above-mentioned range, a base fabric to be obtained is likely to obtain sufficient mechanical characteristics (such as tensile strength and tear strength). An upper limit of the tenacity is not particularly limited. The tenacity of the fiber is calculated through measurement under the constant rate extension conditions specified in the JIS L 1013(2010)8.5.1 standard test.

It is preferred that the elongation of the fiber be equal to or less than 25%, more preferably equal to or less than 24%. When the elongation of the fiber falls within the above-mentioned range, a fabric to be obtained is excellent in toughness and breaking work quantity. Further, the fiber exhibiting the elongation that falls within the above-mentioned range may be improved in ease of spinning and weaving. The elongation of the fiber is calculated based on the extension given at a point indicating the maximum strength on an S-S curve obtained at the time of calculating the above-mentioned tenacity.

For the fiber of this example, to improve the productivity of a spinning step, a elongation step, and a processing step or characteristics of a fabric to be obtained, additives such as a heat stabilizer, an antioxidant, a light stabilizer, a lubricating agent, an antistatic agent, a plasticizer, a thickener, a pigment, and a fire retardant may suitably be blended.

It is preferred that a tensile strength of the base fabric for an airbag be equal to or more than 600 N/cm in both the warp direction and the weft direction, more preferably equal to or more than 625 N/cm, further preferably equal to or more than 650 N/cm. An upper limit of the tensile strength is not particularly limited. When the tensile strength falls within the above-mentioned range, an airbag to be obtained is likely to have a sufficient mechanical strength required at the time of expansion.

It is preferred that a basis weight of the base fabric for an airbag be equal to or less than 220 g/m², more preferably equal to or less than 215 g/m². When the basis weight falls within the above-mentioned range, an airbag to be obtained has an appropriate weight. Reduction in weight of the base fabric also directly affects fuel consumption of an automobile. Therefore, it is better to set a lower limit of the basis weight as low as possible. Meanwhile, in view of a required heat resistance capacity, it is preferred that the lower limit of the basis weight be equal to or more than 150 g/m². The basis weight is calculated based on JIS L 1096(2010)8.3.2.

It is preferred that a thickness of the base fabric for an airbag including a coating layer be equal to or less than 0.35 mm, more preferably equal to or less than 0.33 mm. When the thickness of the base fabric falls within the above-mentioned range, the base fabric is excellent in compactness and is excellent in storability. Moreover, a vehicle to which the airbag is mounted is likely to provide a sufficient space for passengers. Further, the vehicle is likely to be enhanced in the degree of freedom in design of a cabin.

It is preferred that a cover factor of the base fabric for an airbag be 1600 to 2300, more preferably 1700 to 2000. When the cover factor falls within the above-mentioned range, a base fabric for an airbag which is excellent in flexibility, thinness, and lightness can be obtained.

The cover factor is defined by formula (1). The "warp density" corresponds to a thread count of the warp per 1 inch (2.54 cm), and the "weft number" corresponds to a thread count of the weft per 1 inch (2.54 cm).

$$\text{Cover factor} = \text{warp density} \times \sqrt{\text{total fineness of warp}} + \text{weft number} \times \sqrt{\text{total fineness of weft}} \quad (1)$$

It is preferred that the base fabric for an airbag be a coated fabric in which at least two kinds of resins having different elongations are arranged on a fabric. In this example, those resins are coating resins. The two kinds of coating resins are arranged as a first layer and a second layer, respectively. It is preferred that a high-elongation resin be arranged in a first layer in contact with the fabric and that a low-elongation resin be arranged in a second layer laminated on the first layer.

The high-elongation resin in the first layer is a resin having a breaking elongation of equal to or more than 500%. It is preferred that the breaking elongation of the high-elongation resin be equal to or more than 600%. When the breaking elongation of the first-layer resin falls within the above-mentioned range, a base fabric to be obtained has a sufficient tear resistance so that even when a cut is made in the base fabric, the cut is less liable to extend. Further, in the base fabric, when the first-layer resin in contact with the base fabric has a high elongation, the resin layer follows bending of the base fabric to extend. Thus, the storability at the time of folding is improved.

Further, the low-elongation resin of the second layer is a resin having a breaking elongation equal to or less than 300%. It is preferred that a breaking elongation of the low-elongation resin be equal to or less than 200%. When the breaking elongation of the second-layer resin falls within the above-mentioned range, a base fabric to be obtained has a low hardness so that sharp edges (such as broken pieces of glass) are less liable to stick through the base fabric.

The above-mentioned breaking elongation of the resin is a value measured using a type-3 dumb-bell test piece based on JIS K 6251(2010)3.2.

It is preferred that a film strength (tenacity) of each of the two kinds of coating resins be equal to or more than 3.0 MPa. When the film strength falls within the above-mentioned range, an airbag to be obtained can sufficiently tolerate an impact of gas discharged from an inflator at the time of expansion of the airbag. Further, a cover film is less liable to be torn, and a desired air permeability is more likely to be maintained. The film strength is a value measured by the method described in Example.

The coating resin is not particularly limited. Examples of the coating resin include a silicone resin, a polyamide-based resin, a polyurethane resin, and a fluorine resin. Among those, it is preferred that the coating resin be a silicone resin, more preferably, a dimethyl-based silicone, a methylvinyl-based silicone, a methylphenyl-based silicone, or a fluoro-based silicone. With regard to the coating resin, it is only required that a combination of resins to be used for the first layer and the second layer be selected in consideration of the breaking elongation of the resin.

In view of excellence in the smoothness, the passenger restraining performance, the flexibility, and the storability, it is preferred that a total lamination amount of the coating resin be equal to or more than 10 $g/m^2$, more preferably equal to or more than 15 $g/m^2$. Similarly, it is preferred that the total lamination amount of the coating resin be equal to or less than 45 $g/m^2$, more preferably equal to or less than 30 $g/m^2$. When the total lamination amount of the coating resin is equal to or more than 10 $g/m^2$, resin layers having an even and smooth surface are formed, and hence the base fabric to be obtained may have an excellent low air permeability.

A coating amount ratio (weight ratio) of the first layer and the second layer is not particularly limited. It is preferred that the coating amount ratio of the first layer to the second layer be about 1:1 or 1:2.

In the base fabric for an airbag according to this example, a puncture load (JIS T 8051(2005)5) is equal to or more than 6.0 N, and values obtained by dividing a bending stiffness (method A of JIS L 1096(2010)8.21) in each of a warp direction and a weft direction by a cover factor are equal to or less than 0.030 mm. The puncture load is measured by, with use of a sewing-machine needle DB×1#21 manufactured by ORGAN (or a sewing-machine needle equivalent to it), perpendicularly puncturing a base fabric fixed in the manner specified in JIS T 8051(2005)5, measuring maximum loads at three positions given at the time of puncturing, and calculating an average value thereof. Further, the bending stiffness is a value calculated by, based on the method A of JIS L 1096(2010)8.21, performing measurement with use of a test piece having a length of 150 mm and a width of 20 mm in each of the warp direction and the weft direction.

In the base fabric, a puncture load of equal to or more than 6.0 N is required. Accordingly, the base fabric can prevent breakage of the base fabric by, for example, corner portions of scattered pieces of glass. When the puncture resistance is less than 6.0 N, the base fabric is liable to be broken by scattered pieces of glass, and the expansion performance may be lost.

In general, the bending stiffness of the base fabric tends to be higher as a cover factor is higher. The base fabric having a high bending stiffness tends to be high in bending repellency at the time of folding and be lowered in storability after folding. As a method of improving the bending stiffness of the coated fabric, for example, the elongation of the resin to be applied may be increased, or the application amount of the resin may be increased. However, any of the methods may result in reduction in the puncture resistance.

For the base fabric for an airbag, it is required that values obtained by dividing a bending stiffness in each of the warp direction and the weft direction by the cover factor (the values are also referred to as a bending stiffness (warp)/CF and a bending stiffness (weft)/CF) each be equal to or less than 0.030 mm. Accordingly, the base fabric to be obtained is excellent in storability.

Airbag

The airbag is obtained by sewing the above-mentioned base fabric for an airbag. The airbag may be manufactured by a known method. For example, the airbag can be obtained by sewing the base fabric for an airbag into a known bag-like shape by a known sewing method.

Airbag Module

The airbag module to be obtained by this example is an airbag module including the above-mentioned airbag, and may be manufactured by a known method. That is, the airbag module is manufactured by, for example, mounting an attachment device such as an inflator to an airbag.

Manufacturing Method for Base Fabric for Airbag

A manufacturing method for a base fabric for an airbag (also simply referred to as "manufacturing method for a base fabric") is a method of manufacturing the above-mentioned base fabric for an airbag. Specifically, the manufacturing method for a base fabric includes an application step of applying two layers of resins having different elongations in superposition. The application step includes a first-layer forming step of arranging a resin having an elongation of equal to or more than 500% as a first layer in contact with the fabric and a second-layer forming step of arranging a resin having an elongation of equal to or less than 300% as a second layer on the first layer. As described above, according to the manufacturing method for a base fabric, two layers of resins having different elongations are coated in superposition. Thus, other steps described below are mere examples, and may be suitably replaced with other publicly known steps.

First, the warp is placed on a loom after warping, and then the weft is placed on the loom. The loom is not particularly limited. Specifically, examples of the loom include a water jet loom, an air jet loom, and a rapier loom. Among those looms, it is preferred that the loom be the water jet loom because high-speed weaving is relatively easy and the productivity can easily be enhanced. It is preferred that the warp and the weft be the polyamide fiber of the same kind. Further, it is preferred that the warp and the weft be woven such as to have the same weaving density. In this example, "the polyamide fiber of the same kind" means that the fibers are the same in kind of polymer, single fiber fineness, total fineness, the number of filaments, and physical property. Further, "the same weaving density" means that a difference in weaving density between the warp and weft after weaving is within 1.5 threads/2.54 cm. The weaving density is calculated based on JIS L 1096(2010)8.6.1.

In the manufacturing method, at least two kinds of coating resins are arranged on the fabric having been woven (application step). Specifically, in the application step, the high-elongation resin is arranged on the first layer in contact with the fabric obtained by weaving (first-layer forming step). Then, on the second layer to be laminated, the low-elongation resin is arranged (second-layer forming step). The high-elongation resin on the first layer (resin having a breaking elongation of equal to or more than 500%) and the low-elongation resin on the second layer (resin having a breaking elongation of equal to or less than 300%) are as described above.

The resin coated on the fabric is as described above. As a method and an apparatus for forming a resin on a fabric, a known method and apparatus for coating may be employed. It is preferred that the resin be applied by floating knife coating. In the first layer, the resin forming the resin layer can easily be permeated into the fabric. Thus, the adhesion is improved, and the surface of the resin layer can easily be formed smooth. After the first layer is formed, the second layer is formed on the first layer. A method of forming the second layer may be the same as or different from the method of forming the first layer. The resin layers are formed (coated) with the lamination amounts and the weight ratio (first layer:second layer) described above. After the resin layers are formed, it is preferred that heating be performed (thermal curing setting step be performed) at a temperature of from a room temperature to 220° C. for curing and thermal stabilization process for the resin.

Above, one example is described. However, this disclosure is not especially limited to the above-mentioned example. The example described above mainly describes our fabrics, airbags and methods having the following configuration.

The base fabric for an airbag, the manufacturing method for a base fabric for an airbag, and the airbag mainly include the following configurations.

(1) A base fabric for an airbag, wherein a puncture load (JIS T 8051(2005)5) is equal to or more than 6.0 N, and wherein values obtained by dividing a bending stiffness (method A of JIS L 1096(2010)8.21) in each of a warp direction and a weft direction by a cover factor are equal to or less than 0.030 mm.

(2) The base fabric for an airbag according to Item (1), wherein at least two kinds of resins having different elongations are arranged, wherein a resin having an elongation of equal to or more than 500% is arranged on a first layer in contact with the fabric, and wherein a resin having an elongation of equal to or less than 300% is arranged on a second layer which is laminated on the first layer.

(3) A manufacturing method for the base fabric of Item (1) or (2), comprising an application step of applying two layers of resins having different elongations in superposition, wherein the application step includes: a first-layer forming step of arranging, as a first layer in contact with a fabric, a resin having an elongation of equal to or more than 500%; and a second-layer forming step of arranging, as a second layer, a resin having an elongation of equal to or less than 300% on the first layer.

(4) An airbag using the base fabric for an airbag of Item (1) or (2).

EXAMPLE

Our fabrics, airbags and methods are specifically described with Examples. This disclosure is not limited to those Examples. In Examples and Comparative Examples, the respective characteristic values were calculated by the following measurement methods.

Measurement Methods
Total Fineness

The total fineness was calculated by measuring a fineness based on corrected mass at a predetermined load of 0.045 cN/dtex based on the method A of JIS L 1013(2010)8.3.1.

Tenacity of Resin

The tenacity of the resin was calculated through measurement with a type-3 dumb-bell test piece based on JIS K 6251(2010)3.1.

Breaking Elongation of Resin

The breaking elongation of the resin was calculated through measurement with a type-3 dumb-bell test piece based on JIS K 6251(2010)3.2.

Puncture Load

A sewing-machine needle DB×1#21 manufactured by ORGAN was mounted to a tension/compression tester, and a base fabric fixed in the manner specified in JIS T 8051 (2005)5 was perpendicularly punctured at 100 mm/min. Then, maximum loads given at the time of puncturing was measured three times, and an average value thereof was calculated.

Bending Stiffness

The bending stiffness was calculated by, based on the method A of JIS L 1096(2010)8.21, performing measurement with use of a test piece having a length of 150 mm and a width of 20 mm in each of the warp direction and the weft direction.

Weaving Density

Based on JIS L 1096(2010)8.6.1, a sample was placed on a flat table, and unnatural wrinkles and tensile force were removed. Then, the number of warp and weft were counted for each section of 2.54 cm (2.54 cm×2.54 cm) at five different positions, and respective average values were calculated.

Basis Weight

Based on JIS L 1096(2010)8.4.2, three test pieces each having a size of 20 cm×20 cm were collected. Then, respective masses (g) were measured, and an average value thereof was expressed in mass per 1 $m^2$ ($g/m^2$).

Tenacity

Based on JIS K 6404(2015)3.1, by the test method B (strip method), for each of the warp direction and the weft direction, five test pieces were collected, and yarns were removed from both sides in the width to have a width of 30 mm. Then, on a tester of a constant-rate tension type, the test piece was pulled with a grab distance of 150 mm and a tension rate of 200 mm/min until the test piece was broken. A maximum load given at the time of breakage was measured, and an average value was calculated for each of the warp direction and the weft direction.

Thickness

Based on JIS L 1096(2010)8.5, for five different positions of the sample, with use of a thickness measuring device, under the pressure of 23.5 kPa, a thickness was measured after waiting 10 seconds to allow the thickness to settle, and an average value was calculated.

Example 1

Preparation of Fabric

A non-twist synthetic fiber multi-filament being formed of nylon 6,6, having a circular sectional shape, being formed of a filament having 136 single fibers with a single fiber fineness of 3.45 dtex, having a total fineness of 470 dtex, having a tenacity of 8.4 cN/dtex, and having an elongation of 23.5% was prepared. The multi-filament described above was used as the warp and the weft, and a plain fabric was woven, in which the weaving densities of the warp and the weft were both 46 threads/2.54 cm with use of a water jet loom.

Resin Coating and Heat Setting

Next, the obtained fabric was suitably scoured and dried by a conventional method. After that, a high-elongation silicone resin (A) described below was applied to the first layer by floating knife coating, and heat setting processing was performed with a pin stenter drier at 200° C. for 1 minute, thereby obtaining a base fabric with a coating amount of 12.5 $g/m^2$. After that, in a mode of laminating on the first layer, a low-elongation silicone resin (B) described below being the second layer was applied by the floating knife coating again, and heat setting processing was performed with a pin stenter drier at 200° C. for 1 minute, thereby obtaining a coated fabric with a coating amount of 12.5 $g/m^2$ and a total coating amount of 25.0 $g/m^2$ for the first layer and the second layer.

High-elongation silicone resin (A): film strength of 7.0 MPa, breaking elongation of 1100%
Low-elongation silicone resin (B): film strength of 6.4 MPa, breaking elongation of 270%

Example 2

Preparation of Fabric
As the fabric, a nylon 6,6 base fabric similar to that of Example 1 was prepared.
Resin Coating and Heat Setting
Next, a high-elongation silicone resin (C) with a coating amount of 10.0 g/m² was fabricated on a first layer of the obtained resin, and a low-elongation silicone resin (D) with a coating amount of 16.0 g/m² was fabricated as a second-layer resin. Then, scouring, coating, and heat setting were performed in the same manner as those of Example 1.
High-elongation silicone resin (C): film strength of 3.2 MPa, breaking elongation of 520%
Low-elongation silicone resin (D): film strength of 6.8 MPa, breaking elongation of 520%

Example 3

Preparation of Fabric
As the fabric, a base fabric having a density of 50 threads/2.54 cm was prepared using the nylon 6,6 original yarn similar to that of Example 1.
Resin Coating and Heat Setting
Next, a high-elongation silicone resin (A) with a coating amount of 12.6 g/m² was fabricated on a first layer of the obtained resin, and a low-elongation silicone resin (B) with a coating amount of 12.3 g/m² was fabricated as a second-layer resin. Then, scouring, coating, and heat setting were performed in the same manner as those of Example 1.

Example 4

Preparation of Fabric
A non-twist synthetic fiber multi-filament being formed of nylon 6,6, having a circular sectional shape, being formed of a filament having 136 single fibers with a single fiber fineness of 2.57 dtex, having a total fineness of 350 dtex, having a tenacity of 8.4 cN/dtex, and having an elongation of 24.5% was prepared.
Resin Coating and Heat Setting
Next, a high-elongation silicone resin (A) with a coating amount of 13.5 g/m² was fabricated on a first layer of the obtained resin, and a low-elongation silicone resin (B) with a coating amount of 12.1 g/m² was fabricated as a second-layer resin. Then, scouring, coating, and heat setting were performed in the same manner as those of Example 1.

Example 5

Preparation of Fabric
A non-twist synthetic fiber multi-filament being formed of nylon 6,6, having a circular sectional shape, being formed of a filament having 108 single fibers with a single fiber fineness of 6.48 dtex, having a total fineness of 700 dtex, having a tenacity of 8.4 cN/dtex, and having an elongation of 24.0% was prepared.
Resin Coating and Heat Setting
Next, a high-elongation silicone resin (C) with a coating amount of 12.5 g/m² was fabricated on a first layer of the obtained resin, and a low-elongation silicone resin (D) with a coating amount of 14.0 g/m² was fabricated as a second-layer resin. Then, scouring, coating, and heat setting were performed in the same manner as those of Example 1.

Comparative Example 1

Preparation of Fabric
As the fabric, a nylon 6,6 base fabric similar to that of Example 1 was prepared.
Resin Coating and Heat Setting
Next, a low-elongation silicone resin (B) was used for the first layer of the obtained fabric, and a high-elongation silicone resin (A) was used for the second layer. Then, scouring, coating with the coating amount shown in Table 1, and heat setting were performed in the same manner as those of Example 1.

Comparative Example 2

Preparation of Fabric
As the fabric, a nylon 6,6 base fabric similar to that of Example 1 was prepared.
Resin Coating and Heat Setting
Next, a low-elongation silicone resin (D) was used for the first layer of the obtained fabric, and a high-elongation silicone resin (C) was used for the second layer. Then, scouring, coating with the coating amount shown in Table 1, and heat setting were performed in the same manner as those of Example 1.

Comparative Example 3

Preparation of Fabric
As the fabric, a nylon 6,6 base fabric similar to that of Example 1 was prepared. Resin Coating and Heat Setting
Next, only the high-elongation silicone resin (A) was used for the obtained fabric. Then, scouring, coating with the coating amount shown in Table 1, and heat setting were performed in the same manner as those of Example 1.

Comparative Example 4

Preparation of Fabric
As the fabric, a nylon 6,6 base fabric similar to that of Example 1 was prepared.
Resin Coating and Heat Setting
Next, only the low-elongation silicone resin (B) was used for the obtained fabric. Then, scouring, coating with the coating amount shown in Table 1, and heat setting were performed in the same manner as those of Example 1.

Comparative Example 5

Preparation of Fabric
As the fabric, a nylon 6,6 base fabric similar to that of Example 1 was prepared.
Resin Coating and Heat Setting
Next, only the low-elongation silicone resin (D) was used for the obtained fabric. Then, scouring, coating with the coating amount shown in Table 1, and heat setting were performed in the same manner as those of Example 1.

Comparative Example 6

Preparation of Fabric
As the fabric, a nylon 6,6 base fabric similar to that of Example 3 was prepared.

Resin Coating and Heat Setting

Next, a low-elongation silicone resin (B) was used for the first layer of the obtained fabric, and a high-elongation silicone resin (A) was used for the second layer. Then, scouring, coating with the coating amount shown in Table 1, and heat setting were performed in the same manner as those of Example 3.

Comparative Example 7

Preparation of Fabric

As the fabric, a nylon 6,6 base fabric similar to that of Example 4 was prepared.

Resin Coating and Heat Setting

Next, a low-elongation silicone resin (B) was used for the first layer of the obtained fabric, and a high-elongation silicone resin (A) was used for the second layer. Then, scouring, coating with the coating amount shown in Table 1, and heat setting were performed in the same manner as those of Example 4.

Comparative Example 8

Preparation of Fabric

As the fabric, a nylon 6,6 base fabric similar to that of Example 5 was prepared.

Resin Coating and Heat Setting

Next, a low-elongation silicone resin (D) was used for the first layer of the obtained fabric, and a high-elongation silicone resin (C) was used for the second layer. Then, scouring, coating with the coating amount shown in Table 1, and heat setting were performed in the same manner as those of Example 5.

TABLE 1

| | | | Example | | | | |
|---|---|---|---|---|---|---|---|
| | | | 1 | 2 | 3 | 4 | 5 |
| Total fineness [dTex] | | | 470 | 470 | 470 | 350 | 700 |
| Number of filaments [threads] | | | 136 | 136 | 136 | 136 | 108 |
| Weaving density weft yarn × warp yarn, threads/2.54 cm] | | | 46 × 46 | 46 × 46 | 50 × 50 | 60 × 60 | 41 × 41 |
| CF [—] | | | 1995 | 1995 | 2168 | 1871 | 2646 |
| Basis Weight [g/m²] | | | 210.1 | 211.3 | 217.5 | 205.0 | 267.4 |
| Thickness [mm] | | | 0.27 | 0.28 | 0.31 | 0.30 | 0.38 |
| Tensile strength | Warp [N/cm] | | 710 | 698 | 762 | 630 | 787 |
| | Weft [N/cm] | | 695 | 682 | 731 | 706 | 797 |
| First-layer resin (side in contact with base fabric) | Serial number | | High-elongation resin A | High-elongation resin C | High-elongation resin A | High-elongation resin A | High-elongation resin C |
| | Resin elongation [%] | | 1100% | 520% | 1100% | 1100% | 520% |
| | Resin strength [MPa] | | 7.0 | 3.2 | 7.0 | 7.0 | 3.2 |
| Second-layer resin (laminated on first layer) | Serial number | | Low-elongation resin B | Low-elongation resin D | Low-elongation resin B | Low-elongation resin B | Low-elongation resin D |
| | Resin elongation [%] | | 270% | 180% | 270% | 270% | 180% |
| | Resin strength [MPa] | | 6.4 | 6.8 | 6.4 | 6.4 | 6.8 |
| Second-layer coated base fabric | First-layer coating amount [g/m²] | | 12.5 | 10.0 | 12.6 | 13.5 | 12.5 |
| | Second-layer coating amount [g/m²] | | 12.5 | 16.0 | 12.3 | 12.1 | 14.0 |
| | Total coating amount [g/m²] | | 25.0 | 26.0 | 24.9 | 25.6 | 26.5 |
| | Puncture resistance [N] | | 6.2 | 6.4 | 6.1 | 6.3 | 6.7 |
| | Bending stiffness (warp) [mm] | | 55 | 53 | 60 | 51 | 71 |
| | Bending stiffness (weft) [mm] | | 59 | 56 | 65 | 55 | 66 |
| | Bending stiffness (warp)/CF [mm] | | 0.028 | 0.027 | 0.028 | 0.027 | 0.027 |
| | Bending stiffness (weft)/CF [mm] | | 0.030 | 0.028 | 0.030 | 0.029 | 0.025 |

| | | | Comparative Example | | | |
|---|---|---|---|---|---|---|
| | | | 1 | 2 | 3 | 4 |
| Total fineness [dTex] | | | 470 | 470 | 470 | 470 |
| Number of filaments [threads] | | | 136 | 136 | 136 | 136 |
| Weaving density weft yarn × warp yarn, threads/2.54 cm] | | | 46 × 46 | 46 × 46 | 46 × 46 | 46 × 46 |
| CF [—] | | | 1995 | 1995 | 1995 | 1995 |
| Basis Weight [g/m²] | | | 211.0 | 211.5 | 209.4 | 207.9 |
| Thickness [mm] | | | 0.28 | 0.28 | 0.28 | 0.27 |
| Tensile strength | Warp [N/cm] | | 702 | 680 | 697 | 721 |
| | Weft [N/cm] | | 690 | 682 | 669 | 684 |
| First-layer resin (side in contact with base fabric) | Serial number | | Low-elongation resin B | Low-elongation resin D | High-elongation resin A | Low-elongation resin B |
| | Resin elongation [%] | | 270% | 180% | 1100% | 270% |
| | Resin strength [MPa] | | 6.4 | 6.8 | 7.0 | 6.4 |
| Second-layer resin (laminated on first layer) | Serial number | | High-elongation resin A | High-elongation resin C | — | — |
| | Resin elongation [%] | | 1100% | 520% | — | — |
| | Resin strength [MPa] | | 7.0 | 3.2 | — | — |

TABLE 1-continued

|  |  | | | | |
|---|---|---|---|---|---|
| Second-layer coated base fabric | First-layer coating amount [g/m²] | 13.1 | 12.0 | 25.5 | 23.3 |
|  | Second-layer coating amount [g/m²] | 12.8 | 14.1 | — | — |
|  | Total coating amount [g/m²] | 25.9 | 26.1 | (25.5) | (23.3) |
|  | Puncture resistance [N] | 4.9 | 5.5 | 4.4 | 6.0 |
|  | Bending stiffness (warp) [mm] | 57 | 62 | 56 | 69 |
|  | Bending stiffness (weft) [mm] | 70 | 69 | 58 | 73 |
|  | Bending stiffness (warp)/CF [mm] | 0.029 | 0.031 | 0.028 | 0.035 |
|  | Bending stiffness (weft)/CF [mm] | 0.035 | 0.035 | 0.029 | 0.037 |

| | | Comparative Example | | | |
|---|---|---|---|---|---|
| | | 5 | 6 | 7 | 8 |
| Total fineness [dTex] | | 470 | 470 | 350 | 700 |
| Number of filaments [threads] | | 136 | 136 | 136 | 105 |
| Weaving density weft yarn × warp yarn, threads/2.54 cm] | | 46 × 46 | 50 × 50 | 60 × 60 | 41 × 41 |
| CF [—] | | 1995 | 2168 | 1871 | 2646 |
| Basis Weight [g/m²] | | 211.9 | 217.8 | 205.0 | 267.4 |
| Thickness [mm] | | 0.28 | 0.31 | 0.30 | 0.38 |
| Tensile strength | Warp [N/cm] | 674 | 743 | 622 | 780 |
| | Weft [N/cm] | 662 | 727 | 695 | 802 |
| First-layer resin (side in contact with base fabric) | Serial number | Low-elongation resin D | Low-elongation resin B | Low-elongation resin B | Low-elongation resin D |
| | Resin elongation [%] | 180% | 270% | 270% | 180% |
| | Resin strength [MPa] | 6.8 | 6.4 | 6.4 | 6.8 |
| Second-layer resin (laminated on first layer) | Serial number | — | High-elongation resin A | High-elongation resin A | High-elongation resin C |
| | Resin elongation [%] | — | 1100% | 1100% | 520% |
| | Resin strength [MPa] | — | 7.0 | 7.0 | 3.2 |
| Second-layer coated base fabric | First-layer coating amount [g/m²] | 27.2 | 12.6 | 13.6 | 12.6 |
| | Second-layer coating amount [g/m²] | — | 12.7 | 14.0 | 12.8 |
| | Total coating amount [g/m²] | (27.2) | 25.3 | 27.6 | 25.4 |
| | Puncture resistance [N] | 6.1 | 4.8 | 5.9 | 6.2 |
| | Bending stiffness (warp) [mm] | 72 | 75 | 55 | 81 |
| | Bending stiffness (weft) [mm] | 77 | 81 | 62 | 85 |
| | Bending stiffness (warp)/CF [mm] | 0.036 | 0.035 | 0.029 | 0.031 |
| | Bending stiffness (weft)/CF [mm] | 0.039 | 0.037 | 0.033 | 0.032 |

As shown in Table 1, the base fabrics fabricated in Examples 1 to 5 had a high puncture resistance and were excellent in cut resistance. Further, the base fabrics also had low bending stiffness and were excellent in storability. Meanwhile, the base fabrics fabricated in Comparative Examples 1 to 3 had low puncture load, and were considered to be low in cut resistance. Further, the base fabrics fabricated in Comparative Examples 4, 5, and 8 had high bending stiffness, and were considered to be low in storability. Moreover, the base fabrics fabricated in Comparative Examples 6 and 7 had low puncture load and were considered to be low in cut resistance, and also had low puncture load and were considered to be low in storability.

The invention claimed is:

1. A base fabric for an airbag having a puncture load (JIS T 8051(2005)5) equal to or more than 6.0 N, wherein values obtained by dividing a bending stiffness (method A of JIS L 1096(2010)8.21) in each of a warp direction and a weft direction by a cover factor are equal to or less than 0.030 mm; comprising a fabric and a resin arranged on a first layer comprising a resin having an elongation of equal to or more than 500% and in contact with the fabric, and wherein a resin arranged on a second layer comprising a resin having an elongation of 180% to 300% is which is laminated on the first layer.

2. A manufacturing method for the base fabric of claim 1, comprising an application step of applying two layers of resins having different elongations in superposition, wherein the application step includes:
   a first-layer forming step of arranging, as a first layer in contact with a fabric, a resin having an elongation of equal to or more than 500%; and
   a second-layer forming step of arranging, as a second layer, a resin having an elongation of 180% to 300% on the first layer.

3. An airbag comprising the base fabric of claim 1.

* * * * *